United States Patent [19]

Edwards et al.

[11] Patent Number: 4,975,798
[45] Date of Patent: Dec. 4, 1990

[54] VOLTAGE-CLAMPED INTEGRATED CIRCUIT

[75] Inventors: Arthur J. Edwards, Hoffmann Estates, Ill.; Randall C. Gray, Tempe, Ariz.

[73] Assignee: Motorola Inc., Schaumburg, Ill.

[21] Appl. No.: 402,279

[22] Filed: Sep. 5, 1989

[51] Int. Cl.$^5$ .............................................. H02H 3/20
[52] U.S. Cl. ........................................ 361/56; 361/57; 361/51; 361/93; 361/101; 361/104; 361/111
[58] Field of Search ...................... 361/56, 57, 86, 87, 361/91, 93, 101, 104, 111; 257/23.13

[56] References Cited

U.S. PATENT DOCUMENTS 4,616,286 10/1986 Breece ................................ 301/56
4,740,859 4/1988 Little ............................ 301/111 X Primary Examiner—Derek S. Jennings

[57] ABSTRACT

An automobile alternator regulator integrated circuit having a voltage-supply or -sense node (6) for connection to an external voltage, and a voltage clamp comprising: a pnp bypass transistor (Q1) having a base electrode, an emitter electrode coupled to the node and a collector electrode coupled to ground; a resistor (R1) connected between the base electrode and the node; a Zener diode (Z1-Z4) connected between the base electrode and ground for enabling the bypass transistor when the voltage at the node exceeds a predetermined value, whereby the voltage at the node is clamped to a voltage no greater than the predetermined value; and a fuse (F1) connected between the node and the emitter electrode so as to provide a subsequently identifiable cause of failure if the fuse becomes blown due to excess voltage while allowing subsequent operation of the integrated circuit if the clamp means fails but another part of the integrated circuit remains functional.

18 Claims, 1 Drawing Sheet

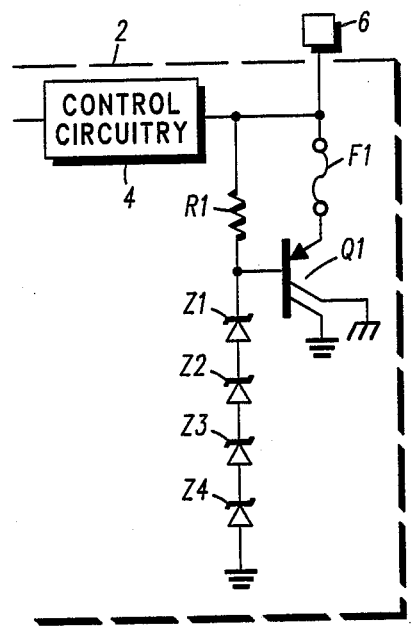
FIG.1
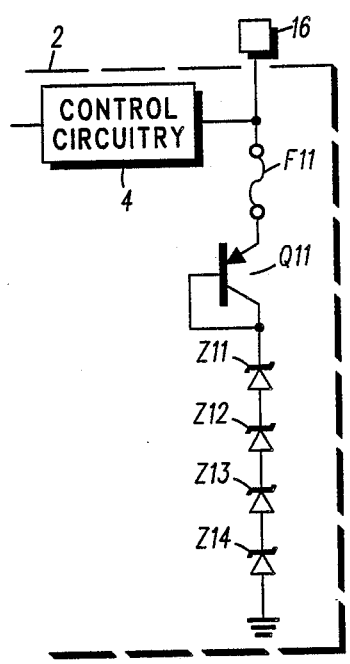
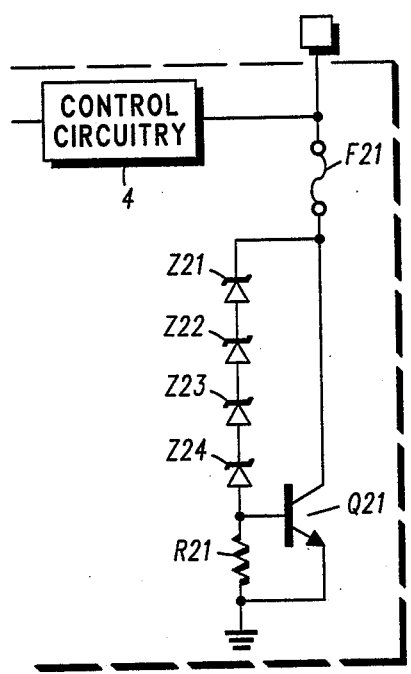
FIG.2
FIG.3

VOLTAGE-CLAMPED INTEGRATED CIRCUIT

INTRODUCTION

This invention relates to voltage-clamped integrated circuits and particularly to such circuits for use in an automotive environment.

DESCRIPTION OF PRIOR ART

In an automotive environment it is common to find transient voltages of many times the normal operating voltage, typically 14V. Indeed, it is common for voltages as large as +/−300V to occur for a few microseconds. Such transients contain little energy, due to their brief duration, and are commonly specified as originating from high resistance sources; nevertheless, they are still capable of damaging semiconductor junctions within an integrated circuit directly connected to a source of such pulses. Even the breakdown voltages (typically in excess of 100V) provided by present semiconductor integrated circuit process technologies offer no guarantee of survival at voltage levels of 300V.

A known method of combatting this difficulty is to voltage-clamp those integrated circuit pads or pins which will be connected to external voltages, e.g. the voltage supply and voltage sense pads. In order to reduce the clamp current and integrated circuit current dissipation, a desired clamp should operate at a level greater than a load-dump (high-energy) transient but less than the limit dictated by integrated circuit process limitations.

A known form of voltage-clamp employs an npn bipolar transistor having its collector connected to the node to be clamped, its emitter connected to ground, and its base connected to the node to be clamped via a number of series-connected Zener diodes to attain the necessary clamping voltage level. The transistor is designed to be able to absorb the energy of the expected transients without any failure or degradation, and the Zener diodes provide base current to the transistor. This arrangement can provide a highly compact structure since all of the components may fit in a single integrated circuit isolation island.

However, there are at least two situations where such a voltage-clamped circuit could be caused to fail and where the failure of the voltage-clamp may lead to the immediate, and perhaps catastrophic, failure of the entire integrated circuit. Two such situations are:

(i) A positive transient of greater than expected energy causes the transistor to fail. Normally when an over-stressed integrated circuit transistor fails it becomes a short circuit, and the ensuing over-current causes massive destruction of the integrated circuit die. This may make subsequent failure analysis back to the original cause impossible.

(ii) The node to be protected is subjected to a negative transient of sufficient energy to cause the integrated circuit to malfunction or even latch-up destructively or non-destructively.

STATEMENT OF INVENTION

It is an object of the present invention to provide an improved integrated circuit wherein the above disadvantages may be overcome or at least alleviated.

In accordance with the present invention there is provided an integrated circuit having a node for connection to an external voltage, and comprising:

voltage clamp means coupled to the node for conducting current from the node when the voltage at the node exceeds a predetermined value, whereby the voltage at the node is clamped to a voltage no greater than the predetermined value, the improvement comprising fuse means connected in series with the voltage clamp means so as to provide a subsequently identifiable cause of failure if the fuse means becomes blown due to excess voltage.

Preferably the clamp means is connected in parallel with another part of the integrated circuit, thereby allowing subsequent operation of the other part of the integrated circuit if the fuse becomes blown but the other part of the integrated circuit remains functional.

BRIEF DESCRIPTION OF DRAWINGS

Three voltage-clamping arrangements for use in automobile alternator regulator integrated circuits in accordance with the present invention will now be described with reference to the accompanying drawings, in which:

FIG. 1 shows a circuit diagram of a first voltage-clamping arrangement for clamping a voltage-supply node in an automobile alternator regulator integrated circuit;

FIG. 2 shows a circuit diagram of a second voltage-clamping arrangement for clamping a voltage-sense node in an automobile alternator regulator integrated circuit; and FIG. 3 shows a circuit diagram of a third voltage-clamping arrangement for clamping a voltage-sense node in an automobile alternator regulator integrated circuit.

DESCRIPTION OF PREFERRED EMBODIMENT

Referring now to FIG. 1 of the drawings, an integrated circuit automobile alternator regulator 2 contains control circuitry 4. The integrated circuit has a pad 6 connected to an externally protruding pin (not shown) for connection to a source of external voltage supply, normally provided from an automobile battery (also not shown) at 14V.

The integrated circuit 2 also includes a voltage-clamping circuit having a power, bipolar, pnp, dual-collector transistor Q1. A resistor R1 is connected between the pad 6 and the base of the transistor Q1. A fuse F1 is connected between the pad 6 and the emitter of the transistor Q1 A first collector of the transistor Q1 is connected to the ground level of the integrated circuit and a second collector of the transistor Q1 is connected to earth. The base of the transistor Q1 is connected through series-connected Zener diodes Z1, Z2, Z3, Z4 to earth. The resistor R1 has a value of 5KΩ, though this value is not critical (the function of the resistor R1 is to bypass leakage current from the Zener diodes Z1–Z4 away from the transistor Q1). The Zener diodes Z1 and Z2 each have reverse breakdown voltages of 30V, and Zener diodes Z3 and Z4 each have reverse breakdown voltages of 7.2V, producing a total reverse breakdown voltage of approximately 75V for the chain of Zener diodes Z1–Z4.

The fuse F1, which isolates the pad 6 from the voltage-clamping circuit (R1, Q1, Z1–Z4), is made, as is typical in integrated circuit technology by the narrowing of cross-section of a metal conductor (not shown) so that the conductor is of less current-carrying capacity than the rest of the current path. The fuse can conduct up to approximately 200 mA without short-term damage but will blow at approximately 500 mA in a relatively short time.

In normal use of the clamping arrangement of FIG. 1, if the voltage at the pad 6 is less than the breakdown voltage of the Zener diode chain Z1–Z4 the voltage at the base of the transistor Q1 remains high and the transistor remains "off"; if, however, the voltage at the pad 6 exceeds the breakdown voltage of the Zener diode chain (but not by enough to blow the fuse F1) the Zener diode chain breaks down, pulling low the base of the transistor Q1 so that the transistor turns "on" and conducts current away from the pad 6 until its voltage falls below the breakdown voltage of the Zener diode chain. In this way the voltage at the pad 6 is clamped to a level no greater than the breakdown voltage of the Zener diode chain Z1–Z4.

Referring now also to FIG. 2 of the drawings, the integrated circuit automobile alternator regulator 2 also contains a pad 16 connected to an externally protruding pin (not shown) for connection to a source of external voltage, normally provided from an automobile battery (also not shown) at +14V. The control circuitry 4 uses the pad 16 to sense the polarity of the applied voltage The integrated circuit 2 also includes a voltage-clamping circuit having a bipolar, pnp, diode-connected transistor Q11. A fuse F11 is connected between the pad 16 and the emitter of the transistor Q11. The collector of the transistor Q11, together with the transistor's base, is connected through series-connected Zener diodes Z11, Z12, Z13, Z14 to earth. The Zener diodes Z11 and Z12 each have reverse breakdown voltages of 7.2V, and Zener diodes Z13 and Z14 each have reverse breakdown voltages of 30V, producing a total reverse breakdown voltage of approximately 75V for the chain of Zener diodes Z11–Z14.

The fuse F11, which isolates the pad 16 from the voltage-clamping circuit (Q11, Z11–Z14), is made, like the fuse F1, by the narrowing of cross-section of a metal conductor (not shown) so that the conductor is of less current-carrying capacity than the rest of the current path. Like the fuse F1, the fuse F11 can conduct up to approximately 200 mA without short-term damage but will blow at approximately 500 mA in a relatively short time.

In normal use of the clamping arrangement of FIG. 2, if the voltage at the pad 16 is less than the breakdown voltage of the Zener diode chain Z11–Z14 the Zener diode chain remains non-conducting; if, however, the voltage at the pad 16 exceeds the breakdown voltage of the Zener diode chain (but not by enough to blow the fuse F1) the Zener diode chain breaks down and conducts current away from the pad 16 until its voltage falls below the breakdown voltage of the Zener diode chain. In this way the voltage at the pad 16 is clamped to a level no greater than the breakdown voltage of the Zener diode chain Z11–Z14. The presence of the diode-connected transistor Q11 is to allow the Zener diodes Z11–Z14 to conduct reverse current when breakdown occurs, but not to conduct current in the opposite direction (and blow the fuse F11) if the automotive battery should be connected with the wrong polarity.

In the integrated circuit of FIG. 2 small transients (creating peak currents of <200 mA) are handled in exactly the same way as in the prior art and as discussed above: the fuses F1 and F11 remain intact and allow their respective clamping arrangements to clamp the voltages at the pads 6 and 16 to values ≦75 V. However, if a large transient occurs at either pad 6 or pad 16, forcing >500 mA through the respective fuse F1 or F11 for a significant time (of the order of 10's of milliseconds), the fuse will blow either before the respective transistor Q1 or Q11 is destroyed or after it fails to a short-circuit. This then allows the control circuit 4 of the integrated circuit to continue operating, provided that the transient voltage which blew the fuse was not too high for the technology used to fabricate the integrated circuit (e.g. ≦100 V, as discussed above).

Thus, now, rather than the integrated circuit chip being totally destroyed by clamp failure due to unexpected levels of excess voltage, the fuse blows and disconnects the clamp circuit, allowing subsequent visual inspection of the integrated circuit layout to identify the cause of the problem. The fuses F1 and F11 allow the control circuit 4 to continue operating if either the clamping arrangements of FIG. 1 or FIG. 2 has been destroyed, since the relevant clamping arrangement is disconnected, and the blown fuse remains a readily identifiable indicator that over-voltage was the cause of failure, even if the integrated circuit die is totally destroyed by the same or a subsequent transient.

Thus, it will be appreciated that in both the clamping arrangement of FIG. 1 and that of FIG. 2 the fuse has two purposes:

(i) it allows integrated circuit operation to continue if a level of over-voltage is applied which causes clamp failure, but is not high enough to destroy the rest of the integrated circuit die, or if a transient causes the clamp circuit to latch; and (ii) it acts as a readily identifiable indicator: if the fuse has blown the integrated circuit has been subjected to an over-voltage or a latch condition; the blown fuse should still be readily identifiable upon subsequent visual inspection of the integrated circuit die, even if the rest of the die has been significantly damaged.

The additional fuse occupies little die area and provides a way of subsequently detecting how certain types of failure may have occurred in any parts subjected to subsequent failure analysis.

Referring now to FIG. 3 of the drawings, as an alternative to the Zener diode chain Z11–Z14, a chain of diodes Z21, Z22, Z23, Z24 (having the same breakdown voltage as those in FIG. 2) may be used, together with a npn bipolar transistor Q21 and a resistor R21. The transistor Q21 has its collector and base connected across the Zener diode chain Z21–Z24, and has its emitter connected to an earth point. The resistor R21 is connected between the base and emitter of the transistor Q21. A fuse F21, similar to the fuses F1 and F11, is connected between the collector of the transistor Q21 and a pad for connection to an external automotive battery voltage.

It will be appreciated that apart from having no reverse current protection (provided by the diode-connected transistor Q11 in FIG. 2) the arrangement operates in an identical manner to that of the already described arrangement of FIG. 2. It will, however, be understood that whereas in the arrangement of FIG. 2 the Zener diodes Z11–Z14 must be high-current devices to conduct the excess energy from the pad 16, the diodes Z21–Z24 can be low-current devices, since in the arrangement of FIG. 3 the conduction path for the excess energy is through the transistor Q21, which alone must be a high-current device.

It will be appreciated that various modifications or alternatives to the above described embodiments will be apparent to the man skilled in the art without departing from the inventive concept.

We claim:

1. An integrated circuit having a node for connection to an external voltage, and comprising:
   voltage clamp means coupled to the node for conducting current from the node when the voltage at the node exceeds a predetermined value, whereby the voltage at the node is clamped to a voltage no greater than the predetermined value,
   the improvement comprising fuse means connected in series with the voltage clamp means so as to provide a subsequently identifiable cause of failure if the fuse means becomes blown due to excess voltage.

2. An integrated circuit according to claim 1 wherein the clamp means is connected in parallel with another part of the integrated circuit, thereby allowing subsequent operation of the other part of the integrated circuit if the fuse becomes blown but the other part of the integrated circuit remains functional.

3. An integrated circuit according to claim 1 further comprising current control means coupled to the fuse means and to the voltage clamp means.

4. An integrated circuit according to claim 1 wherein the voltage clamp means comprises voltage breakdown means and a bypass transistor having a control electrode coupled to the voltage breakdown means, a first current electrode coupled to the fuse, and a second current electrode for connection to a datum potential.

5. An integrated circuit according to claim 4 further comprising a resistance coupled between the node and the control electrode.

6. An integrated circuit according to claim 4 wherein the bypass transistor comprises a pnp bipolar transistor having its emitter as its first current electrode.

7. An integrated circuit according to claim 4 wherein the bypass transistor has a plurality of second current electrodes.

8. An integrated circuit according to claim 3 wherein the current control means comprises diode means.

9. An integrated circuit according to claim 8 wherein the diode means comprises a diode-connected transistor having a control electrode, a first current electrode coupled to the fuse, and a second current electrode coupled to the voltage clamp means.

10. An integrated circuit according to claim 9 wherein the diode-connected transistor comprises a pnp bipolar transistor having its emitter as its first current electrode and having its control electrode connected to its collector.

11. An integrated circuit according to claim 1 wherein the voltage clamp means comprises at least one Zener diode.

12. An integrated circuit according to claim 11 wherein the voltage clamp means comprises a plurality of series-connected Zener diodes.

13. An integrated circuit according to claim 1 wherein the fuse means comprises a narrow cross-section conductor.

14. An integrated circuit according to claim 1 wherein the node is a voltage-supply connection node.

15. An integrated circuit according to claim 1 wherein the node is a voltage-sense connection node.

16. An integrated circuit according to claim 1 wherein the integrated circuit comprises an automobile alternator regulator.

17. An integrated circuit for use in an automotive environment, having a node for connection to an external vOltage, and comprising:
    a pnp bypass transistor having a base electrode, an emitter electrode coupled to the external voltage node and a collector electrode for connection to a datum potential;
    a resistor coupled between the external voltage node and the base electrode of the transistor;
    at least one Zener diode coupled between the base electrode of the transistor and a node for connection to the datum potential for enabling the bypass transistor when the voltage at the node exceeds a predetermined value, whereby the voltage at the external voltage node is clamped to a voltage no greater than the predetermined value; and
    a fuse connected between the external voltage node and the emitter electrode of the bypass transistor means so as to provide a subsequently identifiable cause of failure if the fuse becomes blown due to excess voltage while allowing subsequent operation of the integrated circuit if the clamp means fails but another part of the integrated circuit remains functional.

18. An integrated circuit for use in an automotive environment, having a node for connection to an external voltage, and comprising:
    a pnp diode-connected transistor having an emitter electrode coupled to the external voltage node, and a base electrode and a collector electrode connected together;
    at least one Zener diode coupled between a node for connection to a datum potential and the base and collector electrodes of the diode-connected transistor for conducting current from the external voltage node when the voltage at the external voltage node exceeds a predetermined value, whereby the voltage at the external voltage node is clamped to a voltage no greater than the predetermined value; and
    a fuse connected between the external voltage node and the emitter electrode of the diode-connected transistor so as to provide a subsequently identifiable cause of failure if the fuse becomes blown due to excess voltage while allowing subsequent operation of the integrated circuit if the clamp means fails but another part of the integrated circuit remains functional.

* * * * *